United States Patent
Zhang et al.

(10) Patent No.: US 10,196,905 B2
(45) Date of Patent: Feb. 5, 2019

(54) AIRFOIL FOR TURBOMACHINE AND METHOD OF COOLING SAME

(71) Applicant: Solar Turbines Incorporated, San Diego, CA (US)

(72) Inventors: Luzeng Zhang, San Diego, CA (US); Juan Yin, San Diego, CA (US); Hee-Koo Moon, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 365 days.

(21) Appl. No.: 15/047,179

(22) Filed: Feb. 18, 2016

(65) Prior Publication Data

US 2017/0241270 A1    Aug. 24, 2017

(51) Int. Cl.
*F01D 5/18* (2006.01)
*F04D 29/32* (2006.01)
*F01D 9/04* (2006.01)
*F04D 29/54* (2006.01)

(52) U.S. Cl.
CPC ............. *F01D 5/187* (2013.01); *F01D 9/041* (2013.01); *F04D 29/324* (2013.01); *F04D 29/542* (2013.01); *F05D 2220/30* (2013.01); *F05D 2240/12* (2013.01); *F05D 2240/30* (2013.01); *F05D 2260/201* (2013.01); *F05D 2260/22141* (2013.01); *Y02T 50/676* (2013.01)

(58) Field of Classification Search
CPC ............. F01D 5/18; F01D 5/187; F01D 5/188
See application file for complete search history.

(56) References Cited

U.S. PATENT DOCUMENTS

| | | | |
|---|---|---|---|
| 7,097,426 B2 * | 8/2006 | Lee | 416/97 R |
| 7,293,961 B2 | 11/2007 | Lee et al. | |
| 7,568,887 B1 | 8/2009 | Liang | |
| 2010/0221121 A1 | 9/2010 | Liang | |

* cited by examiner

*Primary Examiner* — Logan M Kraft
*Assistant Examiner* — John S Hunter, Jr.
(74) *Attorney, Agent, or Firm* — Mattingly Burke Cohen & Biederman

(57) ABSTRACT

An airfoil for a turbomachine such as a gas turbine engine includes a switchbacked passage for conveying cooling fluid, and flow-distribution passages in a forward wall so as to direct cooling fluid from the internal passage for back side impingement upon a leading edge of the airfoil. An inner cooling wall forms a passage for discharging the spent cooling air from a trailing edge of the airfoil after impingement, and cools one of a pressure side and a suction side of the airfoil by way of conduction. The switchbacked passage may have a serpentine form.

20 Claims, 3 Drawing Sheets

AIRFOIL FOR TURBOMACHINE AND METHOD OF COOLING SAME

TECHNICAL FIELD

The present disclosure relates generally to cooling an airfoil in a turbomachine, and more particularly to cooling an airfoil by way of conducting heat to an internal cooling wall.

BACKGROUND

Airfoils in the nature of vanes and blades are well-known components of turbomachines such as gas turbine engines. Airfoils may be used to direct flow of fluid through the turbomachine and/or impinged upon by fast moving gases to induce rotation of a compressor of the turbomachine or auxiliary equipment. In either case the service environment can be quite harsh, subjecting vanes, blades and the like to extreme temperatures and pressures.

A great many different cooling schemes for turbomachine components have been proposed over the years. In one well-known strategy for gas turbine engines a cooling fluid, such as compressed air from the engine's compressor, is conveyed into an interior of the airfoil and then discharged through openings in the airfoil body so as to provide a cooling "film" to cool surfaces of the airfoil. Other strategies attempt to cool the airfoil without generating a film as such but instead circulate the fluid through the airfoil and discharge it downstream near a trailing edge of the airfoil. United States Patent Application Publication No. 2010/0221121 to Liang is one such example. Known strategies suffer from a variety of drawbacks relative to certain applications.

SUMMARY

In one aspect, an airfoil for a turbomachine includes an elongate hollow body having a pressure side outer wall and a suction side outer wall each extending between a leading edge and a trailing edge, and having formed therein a switchbacked passage, for conveying a cooling fluid through the airfoil, including an incoming segment connected with a fluid inlet, and an outgoing segment connected with a plurality of fluid outlets formed in the trailing edge. The elongate hollow body further includes at least one inner dividing wall extending between the incoming segment and the outgoing segment, an inner cooling wall positioned in proximity to one of the pressure side outer wall and the suction side outer wall, and a flow-distributing forward wall. The flow-distributing forward wall having formed therein a plurality of openings oriented to direct cooling fluid from the incoming segment toward a back side of the leading edge for impingement thereon, and the inner cooling wall forming a second passage with the one of the pressure side outer wall and the suction side outer wall, for conveying the cooling fluid impinged upon the back side of the leading edge to the plurality of fluid outlets.

In another aspect, a turbomachine includes a housing having a housing inlet and a housing outlet, and an airfoil positioned within the housing and in a flow path of fluid conveyed through the housing between the housing inlet and the housing outlet, the airfoil including an elongate hollow body having an outer body wall forming a pressure side and a suction side. The elongate hollow body has formed therein a switchbacked passage including an incoming segment and an outgoing segment, for conveying cooling fluid through the airfoil, and including a leading edge, and a trailing edge having a plurality of fluid outlets formed therein. The elongate hollow body further includes a flow-distributing forward wall, and an inner cooling wall closer to one of the pressure side and the suction side than to the other. The flow-distributing forward wall has formed therein a plurality of openings oriented to direct cooling fluid from the incoming segment toward a back side of the leading edge for impingement thereon, and the outer body wall and inner cooling wall forming a second passage structured to convey the cooling fluid impinged upon the back side of the leading edge to the plurality of fluid outlets.

In still another aspect, a method of cooling an airfoil includes conveying a cooling fluid in a switchbacked pattern through a first passage in the airfoil, and directing some of the cooling fluid from the first passage toward a back side of a leading edge of the airfoil so as to impinge upon the back side. The method further includes conveying cooling fluid having impinged upon the back side through a second passage defined in part by an inner cooling wall of the airfoil and in part by an outer body wall of the airfoil, and conducting heat from at least one of the pressure side and the suction side to the inner cooling wall. The method still further includes dissipating heat from the inner cooling wall to cooling fluid flowing through at least one of the first passage and the second passage, and discharging the cooling fluid from the first passage and the second passage through a plurality of outlets of the airfoil.

BRIEF DESCRIPTION OF THE DRAWINGS

FIG. 2a is a detailed enlargement of a part of FIG. 2;

FIG. 2b is another detailed enlargement of another part of FIG. 2; and

DETAILED DESCRIPTION

Figure 1:
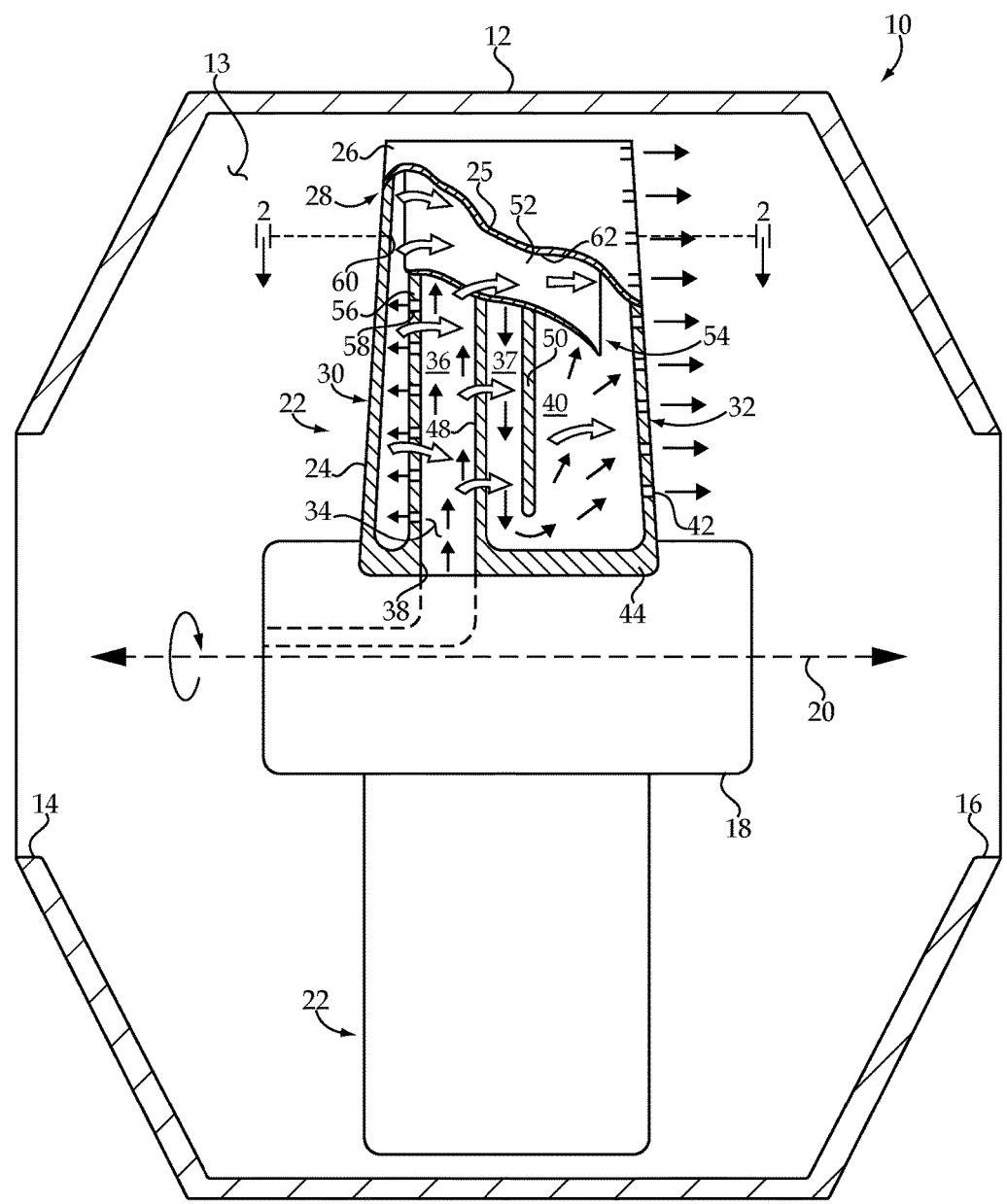
FIG. 1 is a partially sectioned side diagrammatic view of an airfoil within a turbomachine, according to one embodiment.

Referring to FIG. 1, there is shown a turbomachine 10 in the nature of a gas turbine engine, for example, and including a housing 12 having an inlet 14 and an outlet 16 formed therein. A fluid flow path extends through housing 12 between inlet 14 and outlet 16, and includes a space 13. A rotor 18 is positioned at least partially within space 13 and rotates about an axis 20. A plurality of airfoils 22, one of which is shown in section view and discussed further herein, may have the form of turbine blades, and are mounted to rotor 18 and induced to rotate by way of impingement of gases conveyed through housing 12 in a well-known manner. Each airfoil 22, referred to hereinafter in the singular, may be coupled to rotor 18 by way of a root 44. A fluid conduit 38 may extend through rotor 18 and feeds cooling fluid such as compressed air from a compressor of turbomachine 10 through root 44 and into airfoil 22. Those skilled in the art will be familiar with other turbomachine components that would typically be part of a gas turbine engine, including a compressor driven by way of the rotation of rotor 18, ducting, fuel system components, and still others. In other embodiments, rather than a turbine blade airfoil 22 could be a stationary flow-directing vane, a compressor blade or still another structure in a gas turbine engine or other turbomachine. The subject gas turbine engine could be for aircraft, watercraft or land vehicle propulsion, electrical power generation, driving of a pump, a gas compressor or for any other application. As will be further apparent from the following description, airfoil 22 is uniquely and advantageously configured by way of internal structures and flow path geometry for cooling.

To this end, airfoil 22 includes an elongate hollow body 24 having an outer body wall 25 that is formed by a pressure side outer wall 26 and a suction side outer wall 28 each extending between a leading edge 30 and a trailing edge 32. Reference numerals 26 and 28 are used herein to refer to the respective outer walls of body 24, and also to the corresponding pressure side and suction side of airfoil 22. Body 24 has formed therein a switchbacked passage 34, for conveying a cooling fluid such as compressed air through airfoil 22. In a practical implementation strategy, switchbacked passage 34 may include an incoming segment 36 connected with a fluid inlet 38, and an outgoing segment 40 connected with a plurality of fluid outlets 42 formed in trailing edge 32. A middle segment 37 may connect incoming segment 36 with outgoing segment 40 so that switchbacked passage 34 has a serpentine form, switching back and forth in a spanwise direction within airfoil 22. In the illustrated embodiment, switchbacked passage 34 switches direction twice, although the present disclosure is not thereby limited. In other embodiments, a number of middle segments greater than one might be employed, or potentially no middle segment at all.

Body 24 further includes at least one inner dividing wall 48, 50, extending between incoming segment 36 and outgoing segment 40, an inner cooling wall 52 positioned in proximity to one of pressure side outer wall 26 and suction side outer wall 28, and a flow-distributing forward wall 56. In the embodiment shown, inner cooling wall is in proximity to pressure side outer wall 26 and closer to pressure side outer wall 26 than to suction side outer wall 28. Forward wall 56 may have formed therein a plurality of openings 58 oriented to direct cooling fluid from the incoming segment toward a back side 60 of leading edge 30 for impingement thereon. In a practical implementation strategy, openings 58 may have the form of bores spaced evenly, or at staggered locations, in the spanwise direction along forward wall 56. Openings 58 may be circular, oval, or still another shape, and their orientations can be such that cooling fluid is directed straight at a center of back side 60, although the present disclosure is not strictly limited as such. Openings 58 could also have differing orientations from one another in other embodiments.

Figure 2:
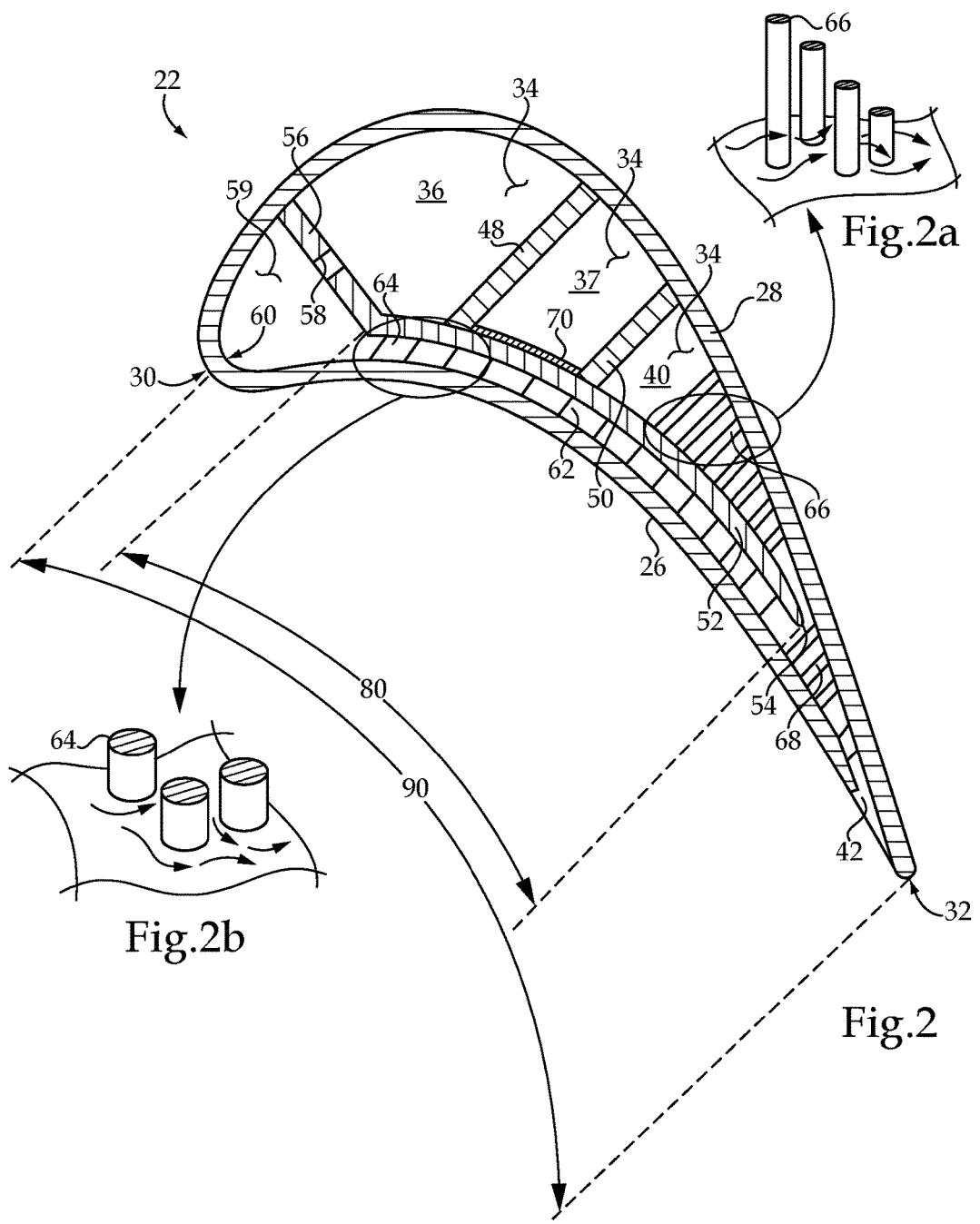
FIG. 2 is a sectioned view taken along line 2-2 of FIG. 1.

Referring also now to FIG. 2, a forward cavity 59 extends in a spanwise direction between leading edge 30 and forward wall 56. Inner cooling wall 52 forms a second passage 62 with the one of pressure side outer wall 26 and suction side outer wall 38, for conveying the cooling fluid impinged upon back side 60 to fluid outlets 42. As will be further apparent from the following description, inner cooling wall 52 may be positioned and airfoil 22 structured such that heat can be conducted directly from at least one of pressure side outer wall 26 and suction side outer wall 28 into inner cooling wall 52, and thenceforth to cooling fluid conveyed through passage 34. Such features are a contrast to certain known designs where inner cooling structures could receive heat conducted predominantly from cooling fluid and not from other structures of the airfoil.

To this end, airfoil 22 may further include a first set of heat conductors 64 positioned within second passage 62 and extending between inner cooling wall 52 and the one of pressure side outer wall 28 and suction side outer wall 26, with which inner cooling wall 52 is in proximity. Airfoil 22 may also include a second set of heat conductors 66 positioned within outgoing segment 40 and extending between inner cooling wall 62 and the other of pressure side outer wall 26 and suction side outer wall 28, with which inner cooling wall 52 is not in proximity. A plurality of trip strips 70 or the like, one of which is shown, may be positioned within passage 34 to induce mixing of cooling fluid conveyed through passage 34. Incoming segment 36 and middle segment 37 may be unobstructed, and thus free of pin fins or the like.

In a practical implementation strategy, a third set of heat conductors 68 may be provided and extend between suction side outer wall 28 and pressure side outer wall 26. Inner cooling wall 52 may be supported between pressure side outer wall 26 and suction side outer wall 28 by way of first and second sets of heat conductors 64 and 66. Inner cooling wall 52 may also include a back edge 54 that defines a confluence of passage 34 and passage 62. As best seen in FIG. 2, flows of cooling fluid having passed through passage 34 and passage 62, after having passed among heat conductors 66 and 64, respectively, and exchanged heat therewith, merge prior to discharging through outlets 42. Heat conductors 68 may also be located downstream from the confluence of passages 62 and 34. As illustrated in the detailed enlargements of FIG. 2, heat conductors 64 may be oval in shape with the ovals oriented to streamwise. Such heat conductors will be recognized by those skilled in the art as so-called pin fins. Other shapes and orientations, as well as combinations of shapes and orientations among the pins fins of any given set, are contemplated within the scope of the present disclosure.

It can also be noted from FIG. 2 that heat conductors 64 are generally uniform in size owing to the more or less uniform thickness or height of passage 62, at least for a majority of its streamwise length 80. Heat Conductors 66 and 68 may have lengths that progressively decrease in a streamwise direction. Inner cooling wall 52 is closer to pressure side outer wall 26 for a majority, and in the illustrated embodiment an entirety, of streamwise length 80 than to suction side outer wall 28. It can also be seen that length 80 is equal to a majority of a streamwise length 90 of airfoil 22 between leading edge 30 and trailing edge 32. In the FIG. 2 version, a relatively abrupt transition between forward wall 56 and inner cooling wall 52 is evident, however, in other instances the two structures could smoothly transition one with the other, and could even be considered part of the same wall. Inner cooling wall 52 may have a spanwise width that is equal to a majority of a spanwise width of airfoil 22, and could be nearly equal to the total spanwise width of airfoil 22.

While no shrouding or the like is shown at an outboard end (not numbered) of airfoil 22, shrouding may be used. Cooling air may be discharged entirely from outlets 42, however, the present disclosure is not thereby limited and embodiments are contemplated where some of the spent air is discharged out of the outboard end, discharged through root 44, or still another strategy used. Inner cooling wall 52, inner dividing walls 48 and 50, pressure side outer wall 26, and suction side outer wall 28 may have uniform thicknesses, and for that matter all of the walls of elongate hollow body 24 may have uniform thicknesses throughout airfoil 22.

As discussed above and apparent from the drawing, in the embodiment of FIG. 2 inner cooling wall 52 is positioned relatively closer to pressure side outer wall 26 than to suction side outer wall 28. Among other features, this construction assists in enabling inner cooling wall 52 to conductively cool pressure side outer wall 26. Heat conductors 64 can be sized and arranged such that heat of material forming pressure side outer wall 26 is conducted directly and through the same material to inner cooling wall 52. It will be appreciated that heat conductors 64, 66, and 68, may all have distributions within their respective passages within airfoil 22, such that the cooling fluid through those passages is more or less uniformly conveyed past or among the corresponding sets of heat conductors. Heat from pressure side outer wall 26 is thus conducted through heat conductors 64 into inner cooling wall 52, and from inner cooling wall 52 to cooling fluid traveling through passage 34 by way of heat conductors 66 as well as the surfaces of inner cooling wall 52 that are otherwise exposed to a flow of cooling fluid. Heat of inner dividing walls 48 and 50 is likewise conducted into inner cooling wall 52.

Figure 3:
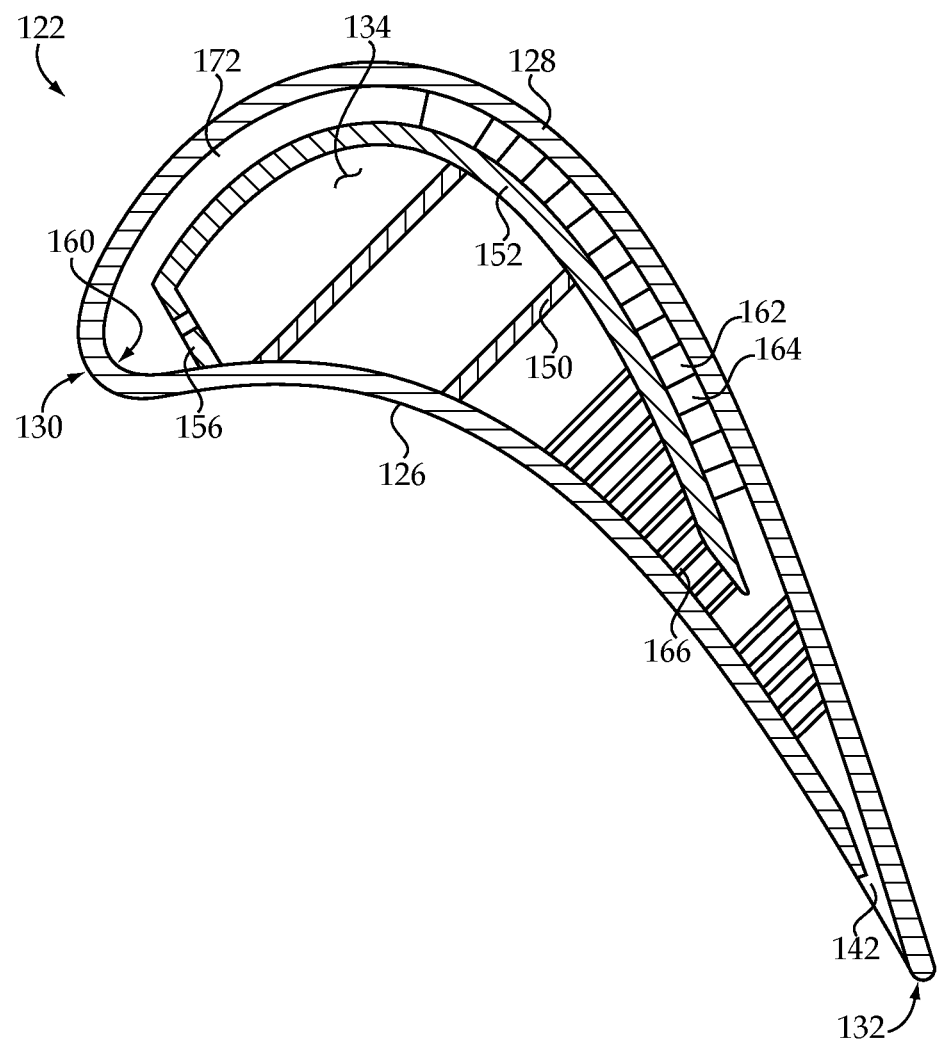
FIG. 3 is a sectioned view through an airfoil, according to another embodiment.

Turning to FIG. 3, there is shown an embodiment of an airfoil 122 with many similarities to airfoil 22 but structured for direct conductive cooling of a suction side outer wall 128 via an inner cooling wall 152, rather than direct cooling of a pressure side outer wall 126 analogous to the embodiment discussed above. In airfoil 122, pressure side outer wall 126 and suction side outer wall 128 extend between a leading edge 130 and a trailing edge 132. A plurality of outlets 142 are formed in or adjacent to trailing edge 132. Inner cooling wall 152 is in proximity to suction side outer wall 128, and extends in parallel with suction side outer wall 128 for an entirety of a streamwise length of inner cooling wall 152. A plurality of openings 156 convey some cooling air that travels through a switchbacked passage 134 toward a back side 160 of leading edge 130. At least one inner dividing wall 150 is positioned between segments of switchbacked passage 134, which may have a serpentine form. A first set of heat conductors 164 are positioned within a passage 162 defined by inner cooling wall 152 and outer body wall 128, and heat conductors 164 extending between inner cooling wall 152 and outer body wall 128 so as to conductively couple the same. Another set of heat conductors 166 extends between inner cooling wall 152 and pressure side outer wall 126 and are exposed to a flow of fluid through passage 134. Additional heat conductors (not numbered) are positioned downstream of a confluence of passages 134 and 162, and extend between outer wall 126 and outer wall 128. A plurality of ribs 172 extend in a streamwise direction between inner cooling wall 152 and outer wall 128. One rib 172 is visible in the FIG. 3 illustration. In a practical implementation strategy, additional ribs 172 are provided that are below the plane of the page in FIG. 3 and above the plane of the page, and are generally oriented parallel to the illustrated one.

It will be noted that airfoil 122 has similarities to airfoil 22, but differs in the positioning of inner cooling wall 152 versus the positioning of inner cooling wall 52 in airfoil 22. While not a visual mirror image, the structure of airfoil 122 can be thought of as a functional mirror image of airfoil 22, with various structural features repositioned to accommodate the positioning of inner cooling wall 152 to provide direct conductive cooling of outer wall 128. Except where otherwise indicated, the foregoing description of features of airfoil 22 can be understood to refer analogously to airfoil 122. Whether airfoil 22, airfoil 122, or some other embodiment is suited for a particular application will depend upon the cooling needs. Where relatively greater cooling efficacy of a pressure side outer wall is desired rather than a suction side outer wall, then an embodiment similar to airfoil 22 might be selected, whereas greater cooling need for a suction side outer wall could be addressed by a design similar to airfoil 122. Those skilled in the art will appreciate further variations on the features of the illustrated embodiments that could address other cooling needs. In certain instances, an airfoil similar to airfoil 22 and a second airfoil similar to airfoil 122 could even be used at different locations within the same turbomachine.

INDUSTRIAL APPLICABILITY

Referring now to the drawings generally, during operation of turbomachine 10 but in particular to the embodiment of FIGS. 1 and 2, a cooling fluid such as compressed air from a compressor rotated by way of the rotation of rotor 18 can be conveyed in a switchbacked pattern through a first passage in airfoil 22, namely, passage 34. Some of the cooling fluid is directed from passage 34 toward back side 60 of leading edge 30 so as to impinge upon back side 30. Cooling fluid having impinged upon back side 60, so-called spent cooling fluid, is directed through passage 62. In a practical implementation strategy, cooling fluid is conveyed from openings 56 into forward cavity 59, and into passage 62 without cross flow. In other words, airfoil 22 is structured so that the fresh cooling fluid provided for impingement cooling of back side 60 does not flow against, around, or across spent cooling fluid having already impinged upon back side 60, at least to any significant degree as compared with certain known designs. Mixing of fresh cooling fluid and spent cooling fluid is thus minimized, resulting in improved efficiency and reduced fluid mass flow requirements for a given cooling efficacy.

Heat conducted into airfoil 22 from hot combustion gases flowing through turbomachine 10 may be conducted into inner cooling wall 52 predominantly from pressure side outer wall 26. In the case of airfoil 122, heat would be analogously conducted into cooling wall 152 predominantly from suction side outer wall 128. Heat conducted into inner cooling wall 52 is dissipated to cooling fluid flowing through passage 34. Depending upon such factors as the particular turbomachine application and duty cycle, thermal and material properties of the turbomachine and airfoil 22, cooling fluid mass flow, and still other factors known to those skilled in the art, energy flow in airfoil 22 may typically be such that heat is conducted from outer wall 26 into inner cooling wall 52, and then from inner cooling wall 52 into the cooling fluid conveyed through passage 34. Some heat conduction back into cooling fluid conveyed through passage 62 could also occur, or still other patterns of energy flow could emerge. Heat will also generally be conducted from inner dividing walls 48 and 50 into inner cooling wall 52, and some heat may be conducted from outer wall 28 into inner cooling wall 52. Spent cooling air is discharged through outlets 42. In any event, those skilled in the art will appreciate that material thicknesses, surface shapes and textures, cross sectional areas and still other factors can be tailored to result in various energy flow patterns to suit particular turbomachine cooling applications. As noted above, the present disclosure is contemplated to provide for reduced mass flow and cooling air pressure requirements while also enabling higher cooling effectiveness than many known designs, without any need for film cooling. The designs are also relatively simple and inexpensive to manufacture by way of known casting and machine techniques. While much of the foregoing description focuses on the embodiment of FIGS. 1 and 2, it should be appreciated the description generally applies also to the embodiment of FIG. 3.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon examination of the attached drawings and appended claims.

What is claimed is:

1. An airfoil for a turbomachine comprising:
an elongate hollow body including a pressure side outer wall and a suction side outer wall each extending between a leading edge and a trailing edge, and having formed therein a switchbacked passage, for conveying a cooling fluid through the airfoil, including an incoming segment connected with a fluid inlet, and an outgoing segment connected with a plurality of fluid outlets formed in the trailing edge;
the elongate hollow body further including at least one inner dividing wall extending between the incoming segment and the outgoing segment, an inner cooling wall positioned in proximity to one of the pressure side outer wall and the suction side outer wall, and a flow-distributing forward wall;
the flow-distributing forward wall having formed therein a plurality of openings oriented to direct cooling fluid from the incoming segment toward a back side of the leading edge for impingement thereon;
the inner cooling wall forming a second passage with the one of the pressure side outer wall and the suction side outer wall, for conveying the cooling fluid impinged upon the back side of the leading edge to the plurality of fluid outlets, and the second passage fluidly connected within the airfoil to the outgoing segment of the switchbacked passage; and
a set of heat conductors extending between the inner cooling wall and the other of the pressure side outer wall and the suction side outer wall, and the set of heat conductors being located in the outgoing segment but not the incoming segment, such that the incoming segment is unobstructed.

2. The airfoil of claim 1 wherein the set of heat conductors is a second set of heat conductors, and the airfoil further comprising a first set of heat conductors positioned within the second passage and extending between the inner cooling wall and the one of the pressure side outer wall and the suction side outer wall.

3. The airfoil of claim 2 wherein the first and second sets of heat conductors include pin fins.

4. The airfoil of claim 2 wherein the inner cooling wall extends in parallel with the one of the pressure side outer wall and the suction side outer wall and is closer to the one of the pressure side outer wall and the suction side outer wall than to the other of the pressure side outer wall and the suction side outer wall.

5. The airfoil of claim 2 wherein the inner cooling wall is supported between the pressure side outer wall and the suction side outer wall by way of the first and second sets of heat conductors, and includes a back edge defining a confluence of the switchbacked passage and the second passage.

6. The airfoil of claim 5 further comprising a third set of heat conductors located downstream from the confluence and extending between the suction side outer wall and the pressure side outer wall.

7. The airfoil of claim 1 wherein the switchbacked passage includes a middle segment fluidly between the incoming segment and the outgoing segment.

8. The airfoil of claim 7 wherein the second passage includes a set of heat conductors extending between the inner cooling wall and the one of the pressure side outer wall and the suction side outer wall.

9. The airfoil of claim 7 wherein each of the incoming segment and the middle segment is unobstructed.

10. The airfoil of claim 1 wherein the inner cooling wall is closer to the suction side outer wall than to the pressure side outer wall, for a majority of a streamwise length of the inner cooling wall, and extends in parallel with the suction side outer wall for an entirety of a streamwise length of the inner cooling wall.

11. The airfoil of claim 1 wherein the inner cooling wall is closer to the pressure side outer wall than to the suction side outer wall, for a majority of a streamwise length of the inner cooling wall, and the flow-distributing forward wall extends from the inner cooling wall to the suction side outer wall.

12. The airfoil of claim 1 wherein a confluence of the switchbacked passage and the second passage is formed within the elongate hollow body at a back edge of the inner cooling wall such that flows of cooling fluid through the respective passages merge prior to discharging through the plurality of fluid outlets.

13. A turbomachine comprising:
a housing having a housing inlet and a housing outlet;
an airfoil within the housing and positioned in a flow path of fluid conveyed through the housing between the housing inlet and the housing outlet, the airfoil including an elongate hollow body having an outer body wall forming a pressure side and a suction side;
the elongate hollow body having formed therein a switchbacked passage including an incoming segment and an outgoing segment, for conveying cooling fluid through the airfoil, and including a leading edge, and a trailing edge having a plurality of fluid outlets formed therein;
the elongate hollow body further including a flow-distributing forward wall, and an inner cooling wall closer to one of the pressure side and the suction side than to the other;
the flow-distributing forward wall having formed therein a plurality of openings oriented to direct cooling fluid from the incoming segment toward a back side of the leading edge for impingement thereon;
the outer body wall and inner cooling wall forming a second passage structured to convey the cooling fluid impinged upon the back side of the leading edge to the plurality of fluid outlets, and the second passage fluidly connected within the airfoil to the outgoing segment of the switchbacked passage; and
a set of heat conductors extending between the inner cooling wall and the other of the pressure side outer wall and the suction side outer wall, and the set of heat conductors being positioned in the outgoing segment but not the incoming segment, such that the incoming segment is unobstructed.

14. The turbomachine of claim 13 wherein the airfoil is part of a turbine blade rotatable within the housing about a longitudinal axis of the turbomachine, and the turbine blade including a blade root having an inlet to the switchbacked passage formed therein.

15. The turbomachine of claim 14 wherein the switchbacked passage has a serpentine form.

16. The turbomachine of claim 14 wherein the set of heat conductors includes a second set of heat conductors, and the elongate hollow body further includes a first set of heat conductors positioned within the second passage, and wherein the inner cooling wall is supported between the pressure side and the suction side by way of the first and second sets of heat conductors.

17. The turbomachine of claim 13 wherein the inner cooling wall is closer to the suction side.

18. The turbomachine of claim 13 wherein the inner cooling wall is closer to the pressure side.

19. A method of cooling an airfoil comprising:
    conveying a cooling fluid in a switchbacked pattern through a first passage in the airfoil, the first passage having an outgoing segment with a set of heat conductors positioned therein, and an incoming segment that is unobstructed by heat conductors;
    directing some of the cooling fluid from the first passage toward a back side of a leading edge of the airfoil so as to impinge upon the back side;
    conveying cooling fluid having impinged upon the back side through a second passage defined in part by an inner cooling wall of the airfoil and in part by an outer body wall of the airfoil;
    conducting heat from one of a pressure side and a suction side of the airfoil to the inner cooling wall by way of the set of heat conductors;
    dissipating heat from the inner cooling wall to cooling fluid flowing through at least one of the first passage and the second passage;
    discharging cooling fluid from the first passage and the second passage through a plurality of outlets of the airfoil; and
    merging a flow of cooling fluid through the first passage with a flow of cooling fluid through the second passage prior to the discharging of the cooling fluid from the first passage and the second passage through a plurality of outlets in the airfoil.

20. The method of claim 19 wherein the merging of the flows of cooling fluid through the first passage and the second passage prior to the discharging includes merging the flow of cooling fluid through the first passage after having passed through each of the incoming segment, the outgoing segment, and a middle segment, of the first passage.

* * * * *